(12) United States Patent
Chao

(10) Patent No.: US 9,694,869 B2
(45) Date of Patent: Jul. 4, 2017

(54) ADJUSTABLE BICYCLE FRAME FOR THE CHANGE IN THE RIDING MODES

(71) Applicant: Hung-Chang Chao, Taipei (TW)

(72) Inventor: Hung-Chang Chao, Taipei (TW)

( * ) Notice: Subject to any disclaimer, the term of this patent is extended or adjusted under 35 U.S.C. 154(b) by 0 days.

(21) Appl. No.: 15/276,560

(22) Filed: Sep. 26, 2016

(65) Prior Publication Data

US 2017/0008595 A1  Jan. 12, 2017

Related U.S. Application Data

(62) Division of application No. 14/409,667, filed on Dec. 19, 2014, now Pat. No. 9,487,262.

(30) Foreign Application Priority Data

Jan. 6, 2013 (CN) .......................... 2013 1 0003660
Jul. 10, 2013 (WO) ............... PCT/CN2013/000832

(51) Int. Cl.
  *B62K 19/18* (2006.01)
  *B62K 15/00* (2006.01)
  *B62K 13/00* (2006.01)
  *B62J 1/08* (2006.01)

(52) U.S. Cl.
  CPC ................ *B62K 19/18* (2013.01); *B62J 1/08* (2013.01); *B62K 13/00* (2013.01); *B62K 15/00* (2013.01)

(58) Field of Classification Search
  CPC ........ B62K 19/18; B62K 15/00; B62K 13/00; B62J 1/08
  See application file for complete search history.

(56) References Cited

U.S. PATENT DOCUMENTS

| 3,304,099 | A | * | 2/1967 | Jankowski | B62K 15/00 280/287 |
| 4,909,537 | A | * | 3/1990 | Tratner | B62K 13/00 280/278 |
| 5,354,085 | A | * | 10/1994 | Gally | B62M 9/16 267/34 |
| 6,354,618 | B1 | * | 3/2002 | Liao | B62K 15/00 280/278 |
| 8,480,113 | B2 | * | 7/2013 | Moldestad | B62K 15/00 280/270 |
| 8,864,159 | B2 | * | 10/2014 | Scolari | B62K 15/00 280/220 |
| 2005/0161898 | A1 | * | 7/2005 | Chao | B62K 19/06 280/278 |

* cited by examiner

*Primary Examiner* — Kevin Hurley
*Assistant Examiner* — Gabriela C Craciun
(74) *Attorney, Agent, or Firm* — Chun-Ming Shih

(57) ABSTRACT

An adjustable bicycle frame for change in the riding modes is provided with a bottom bracket secured to pedals; a seat tube extending upward out of the bottom bracket; a chain stay extending rearward out of the bottom bracket and the seat tube; a rear wheel rotatably secured to the chain stay and contacting the ground; a head tube with a stem pivotably secured thereto; a fork pivotably secured to the head tube and extending downward; a front wheel rotatably secured to the fork stay and contacting the ground; a rearward inclined telescopic tubing including first and second tubes. After changing length of the telescopic tubing, a length between the front wheel and the rear wheel is changed, an inclined angle of the seat tube is changed, and an inclined angle of the head tube is changed coherently, thereby implementing a racing mode or a slow, urban riding mode.

6 Claims, 9 Drawing Sheets

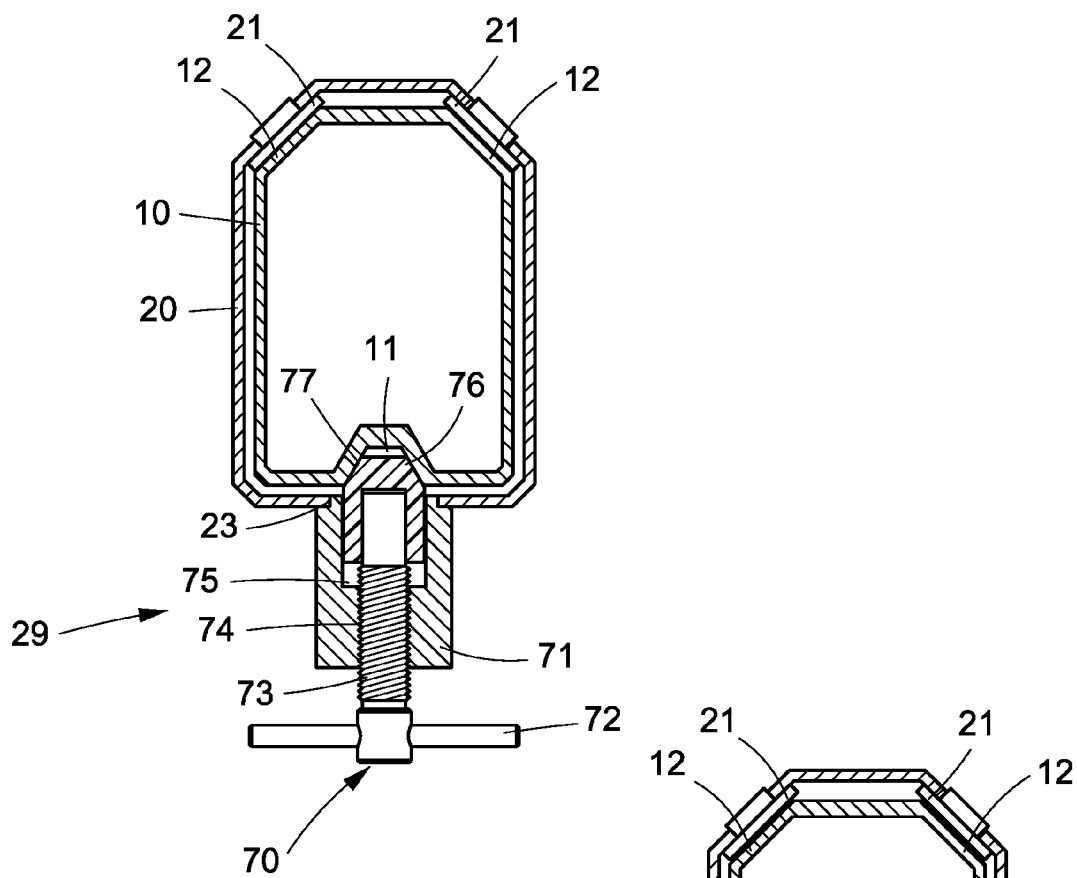
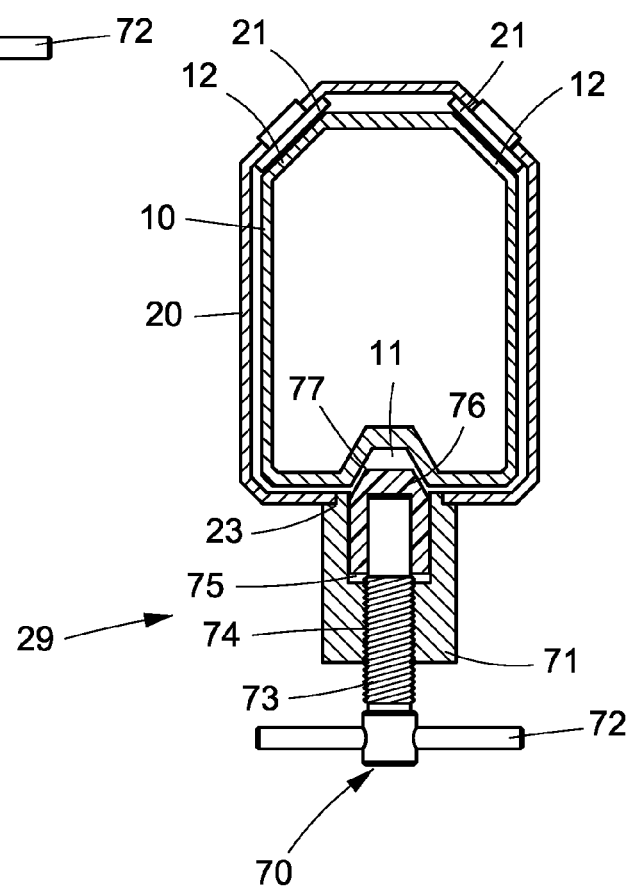

ADJUSTABLE BICYCLE FRAME FOR THE CHANGE IN THE RIDING MODES

CROSS-REFERENCE

This application is a divisional application of U.S. Ser. No. 14/409,667 filed on Dec. 19, 2014.

BACKGROUND OF THE INVENTION

1. Field of the Invention

The invention is aimed at easily adjustable bicycle frame for change in the riding modes. More specifically to such an adjustable bicycle frame allows a rider to incrementally adjust length between front wheel and rear, and a length between seat tube and head tube which coherently change inclined angles of both the seat tube and the head tube in an attempt to attain a selected riding mode for the rider while accepting riders of different body height.

2. Description of Related Art

A conventional bicycle comprises a bottom bracket in which component of a crank with two pedals are secured, a seat tube joins the bottom bracket and extending upward out of it, a chain stay also joins both the bottom bracket and the seat tube and extending rearward out of it. A head tube with a fork pivotably secured to the head tube and extending downward, and a down tube and a crossbar interconnecting the head tube and the seat tube. Other bicycle components are comprised of a rear wheel rotatably secured to the chain stay, a front wheel rotatably secured to the fork stay, a seat post partially fastened to the seat tube, a saddle mounted on the seat post, a stem secured to the head tube, a handlebar secured to the stem for allowing a rider to steer the handlebars in conducting the bicycle, a pedal powered transmission which convey the power to both wheelers and a brake device.

The size and inclined angels of bicycle frame can be configured to accept individuals of different ages and body heights (e.g. bicycles for children, bicycles for teenagers, and bicycles for adults) as well as riding modes (e.g. racing mode, urban mode, and all terrain mode). Fork and head tube are coaxial, hence they have the same inclined angle. In the following description, an inclined angle of the head tube is equal to that of the fork if not described otherwise. The inclined angle of a part stands for an angle of the part with respect to the ground. These are described in the following examples:

As bicycles for children, teenagers, and adults, they are different not only in wheel diameter but also the length between two wheels, front and rear. In general, crossbar and the length between front wheel and rear wheel are shorter for children's and teenager's bicycles, while crossbar and the length between front wheel and rear wheel are longer for adult's bicycles so as to accept tall riders.

Performance of a bicycle relies on the sizes and angles of those parts configured in the bicycle frame. Small changes in terms of the sizes and angles of the parts of bicycle frame will put great impacts on the performance of a bicycle certainly it affects a rider's performance. Since racing bicycles and all terrain bicycles are designed to be greater inclined angles of seat tube and head tube, therefore appropriate for high speed riding. A greater inclined angle (i.e., in the range of 73-75 degrees) is required for seat tube of racing bicycle in order to boost pedaling efficiency. Also, a greater inclined angle (i.e., in the range of 73-75 degrees) are required for head tube for the racing bicycle so as to increase maneuverability. Further, an increased length between seat tube and handlebars is required too. Thus, a rider might lean himself forward in an attempt to minimize drag and boost pedaling efficiency. However, style of riding as leaning forward may be appropriate for professionals but not suitable for ordinary riders who may tend to susceptible to be tiresome. Hence, such angle are not appropriate for slow and relaxed urban riding.

The "city bike" among various bicycles of different utility, is given smaller inclined angles of seat tube and head tube to facilitate for low speed urban riding. The "city bikes" are characterized by relaxed, therefore tend to use shorter length between seat tube and handbar. It is commonly known fact that the inclined angle (i.e., in the range of 69-71 degrees) is typical for seat tube and head tube of the bicycle for city. The smaller inclined angles of seat tube and head tube may hinder pedaling. But it can decrease vibration from the ground when riding. Thus, it is a little merits of comfort. However, there are some drawbacks as well, bicycles having smaller inclined angles of seat tube and head tube are proved not to be appropriate for both high speed riding and hill climbing.

The length between seat tube and head tube is defined as the crossbar length and it should be varied in accordance with the rider's body heights. Longer crossbar length is appropriate for tall persons with longer arms and legs. Further, crossbar length and inclined angles of both head tube and seat tube of a certain riding mode should be slightly different from those another riding mode. An increased length between front wheel and rear wheel, in other words, longer crossbar is required for racing mode. This is because it enables a rider to become forward-leaning pose in order to decrease drag. What's more, greater inclined angle of the seat tube can boost pedaling efficiency. Bicycles with shorter crossbar length are appropriate for relaxed urban riding. Rider may sit upright easily to enjoy riding. It was found that smaller inclined angles of both the head tube and the seat tube help to minimize vibration picked up from the ground.

It is understood through the analysis given above, parts of bicycle frame and inclined angels of the parts should be configured to be able to accept individuals of different ages with body heights yet even their riding modes preferred. (e.g., racing mode, urban mode, and all terrain mode). Normally, frames of typical bicycles are fixed while manufacture. Therefore, it is impossible for the user to change sizes and geometry of the frame. That is, there is no choice, the rider will end up in no choice of selecting an appropriate one. Thus, for a rider could be injured and may be serious at times after a prolonged period of riding. This could be frustrating factor for an enthusiastic rider. Normally, it is impossible of reconfiguring bicycle parts for changing length between two parts and inclined angles of the parts of a typical bicycle frame in order to accommodate different riding modes and different riding conditions.

China Patent Numbers ZL02116476.2 and ZL03264805.7 both disclose a telescopic bicycle and they are characterized in that the crossbar is made telescopic so that the occupying space of a bicycle can be decreased in storage. The length between front wheel and rear wheel are adjustable to suit different heights of the rider. But a sliding tube of the telescopic crossbar may extend to pass the seat tube in the adjustment. To avoid conflicting with the rear wheel space, the telescopic crossbar is placed horizontally above the rear wheel. Inclined angle of the head tube is about the same as that of the seat tube when adjusting the telescopic crossbar. It is impossible of coherently change inclined angles of the head tube and the seat tube while decreasing the length between the head tube and the seat tube. Thus, center of the bicycle is shifted forward in riding after shortening the telescopic bar. And in turn, a rider may tend to tip when descending a hill. What's more, its stability is downgraded.

There is another telescopic bicycle which is characterized in that the crossbar horizontally interconnecting the seat tube and the head tube is cut into two telescopic pieces each having one end secured to the head tube or the seat tube by welding. Further, a lock nut is used to fasten the two pieces together after adjusting length of the crossbar. However, since it can only change length between front wheel and rear wheel and the inclined angles of both seat tube and head tube are still the same, so it cannot implement different riding modes. Thus, center of the bicycle is shifted forward in riding after shortening the telescopic bar. And in turn, a rider may tend to tip when descending a hill. What's more, its stability is downgraded. What's worse, the rider may face the risk of falling off.

SUMMARY OF THE INVENTION

It is understood that a length between the seat tube and the head tube, an inclined angles of both the seat tube, and head tube are vital to the comfort and pedaling efficiency of the rider.

Regarding a length between the seat tube and the head tube, the following can be understood:

The length between seat tube and head tube has to be variable for accepting rider of different body heights. For instance, the length between seat tube and head tube should be made shorter in order to meet short riders' needs. On the other hand, the aforesaid length should be elongated in order to accept tall riders. Furthermore, comfort is one of the essential requirement in an urban riding mode. Thus, shorter length between seat tube and head tube allows a rider to be in upright pose which allow for a joyful riding. In case of racing mode, the high speed and pedaling efficiency are center of focus, therefore larger length between a seat tube and a head tube to allow the rider to be in forward leaning pose in order to decrease drag.

Regarding relative angles of geometry involving an inclined angle of both the seat tube and the head tube:

Comfort is the key word of a low speed urban riding mode. Naturally, the inclined angle of the seat tube and an inclined angle of the head tube are small. Smaller inclined angle of both the seat tube and the head tube can effectively decrease vibration from the ground while moving, thus the riding become more comfortable. Small inclined angle of the seat tube decrease pedaling efficiency. It is obvious that the low speed is the manner of the mode in the urban riding.

On the other hand, high speed and pedaling efficiency are the center focus in the racing mode. Hence, inclined angles are set larger for both seat tube and head tube. Greater inclined angle of the seat tube facilitates pedaling, as a result, both pedaling efficiency and riding speed are boosted. Therefore, greater inclined angle of the head tube helps to increase maneuverability.

It is therefore one object of the invention to provide an adjustable bicycle frame allowing a rider to incrementally adjust length between front wheel and rear wheel, a length between seat tube and head tube, an inclined angle of the seat tube, and an inclined angle of the head tube so as to meet the needs of the selected riding mode and accept riders of different body heights.

It is another object of the invention to provide an adjustable bicycle frame which allows rider to prefer different riding modes such as racing and urban mode with the same bicycle so the rider has his freedom of selection. What's more, rider can arrange a bicycle frame to a desired configuration based on his or her preference for optimum joy of riding.

It is still another object of the invention to provide an adjustable bicycle frame for the change in the riding modes. The invention allows a rider to coherently change inclined angles of both the seat tube and the head tube while adjusting length between the front wheel and the rear wheel, in attempt to attain a selected riding mode such as fast racing mode or slow urban mode. Further, after increasing the length between the front wheel and the rear wheel, and coherently increasing inclined angles of the seat tube and the head tube, the rider may leaning himself forward in order to decrease drag and increase pedaling efficiency without sacrificing maneuverability. On the other hand, inclined angle of the seat tube and inclined angle of the head tube are decreased after decreasing the length between the seat tube and the head tube. This will allow rider to sit upright in a relaxed pose. Since the smaller inclined angles of the seat tube and head tube will cause the center of the gravity to move toward rear, the rider may be out of harm's way when making an emergency brake or going down the hill.

It is yet another object of the invention to provide an adjustable bicycle frame for the change in the riding modes. The invention has provided at least one locking device for securing the telescopically connected first and second tubes. Also, an axial component of the pedaling force is prevented from exerting on the lock device, thereby enabling a rider to operate for prolonged period of time without damaging it. In one embodiment of the locking device, it is a transverse lock device, and the pushing members are disposed on sides of the frame for ease of operation. Riders do not have to squat down when manipulating the lock device. So, it is very convenient and time saving.

To achieve above and other objects of the invention, an adjustable bicycle frame is provided for the change in riding modes which comprising a bottom bracket in which component of a crank with two pedals are secured. A seat tube joined the bottom bracket and extending upward out of the bottom bracket; a chain stay joined the bottom bracket and the seat tube and extending rearward out of the bottom bracket; a rear wheel rotatably secured to the chain stay and being in contact with a supporting ground; a head tube with a stem pivotably secured thereto; a fork pivotably secured to the head tube and extending downward; a front wheel rotatably secured to the fork stay and being in contact with the supporting ground; a rearward inclined telescopic tubing including a first tube and a second tube, the first tube is extending into the second tube allowing telescopically change the total length of the both tubes put together. Wherein the second tube is inclined and extends forward, upward out of the lower end of the seat tube and in the vicinity of the bottom bracket; the first tube is connected to the head tube and extends rearward, downward out of the head tube. In response to changing length of the telescopic tubing, a length between the front wheel and the rear wheel is changed, the inclined angles of the seat tube and head tube are changed coherently. Due to inclination of the telescopic tubing and the contact of the supporting ground with both the front and rear wheels so as to implement a selected one of a plurality of riding modes; and at least one lock device each for locking both the first and second tubes on a predetermined position.

In one preferred embodiment, further comprises at least one crossbar interconnecting the seat tube and the second tube.

In one preferred embodiment, the at least one crossbar is disposed on a top of the second tube, a bottom of the second tube, or both the top and bottom of the second tube.

In one preferred embodiment, each of the at least one lock device comprises a groove having a truncated conic longitudinal section formed on the first tube; an aperture formed on the second tube and disposed under the groove; a body; an urging member; two opposite pushing members; and an actuator; wherein the body is disposed below the aperture of the second tube and includes a vertical hole for receiving the urging member, and a horizontal hole for receiving the pushing members; wherein the urging member includes a conic top complimentarily disposed in the groove of the first tube, and an inverted conic bottom; wherein the pushing members are received in both ends of the horizontal hole respectively, each of the pushing members include an inclined surface urging against the inverted conic bottom of the urging member; and an actuation of the actuator draws the pushing members toward each other to cause the inclined surfaces of the pushing members to urge the inverted conic bottom so that the urging member moves upward, the conic top of the pushing member passes through the aperture of the second tube to urge against the groove of the first tube, and the first and second tubes are fastened together.

In one preferred embodiment, the actuator includes a knob and a threaded shaft, and wherein each of the pushing members includes axial internal threads so that a turning of the knob threadedly pushes the threaded shaft through the axial internal threads to move the pushing members toward each other or draw the pushing members away from each other.

In one preferred embodiment, the body includes a guide rail in the horizontal groove, and wherein each of the pushing members include a guide trough complimentarily disposed on the guide rail so that the pushing members are capable of linearly moving in the horizontal hole of the body.

In one preferred embodiment, the first tube further includes at least one top having a truncated gable longitudinal section, and wherein the second tube further includes at least one spacer on an inner surface contacting the at least one top of the first tube so that in response to urging the at least one top of the first tube against the at least one spacer of the second tube, the first and second tubes are fastened together.

In one preferred embodiment, the groove having a truncated conic longitudinal section is formed on a bottom of the first tube.

In one preferred embodiment, each of the at least one lock device comprises a groove having a truncated conic longitudinal section formed on the first tube; an aperture formed on the second tube and disposed under the groove; an urging member; and an actuation device; wherein the urging member includes a conic top complimentarily disposed in the groove of the first tube; and wherein the actuation device includes an internally threaded nut with the urging member received therein, a handle, and a threaded shaft formed with the handle and threadedly secured to the internally threaded nut s so that a turning of the handle moves the threaded shaft which in turn pushes the urging member further into the groove of the first tube to fasten the first and second tubes together.

In comparison with the conventional art, the invention has the following advantages: It allows a rider to incrementally adjust the length between the front wheel and the rear wheel, a length between the seat tube and the head tube, and coherently change those inclined angle of both the seat tube and the head tube in an attempt to attain a selected riding mode while accepting riders of different body heights. Inclined angle of the head tube is increased coherently after increasing the length between the seat tube and the head tube. The rider may lean himself forward to decrease drag and facilitate pedaling. Thus a maximum maneuverability can also be obtained. On the contrary, inclined angle of the seat tube are decreased coherently after decreasing the length between the seat tube and the head tube, allowing rider to sit upright in a relaxed pose for comfortable riding. Since the smaller inclined angles of the seat tube and head tube will cause the center of the gravity to move toward rear, rider may became less vulnerable to the accident while making an emergency brake or descending the hill.

The above and other objects, features and advantages of the invention will become apparent from the following detailed description taken with the accompanying drawings.

BRIEF DESCRIPTION OF THE DRAWINGS

FIG. 8 is a longitudinal sectional view of the first tube, the second tube, and a lock device according to a second preferred embodiment of the invention assembled and fastened;

FIG. 9 is a view similar to FIG. 8 except the first and second tubes are not fastened by the lock device;

DETAILED DESCRIPTION OF THE INVENTION

Figure 1:
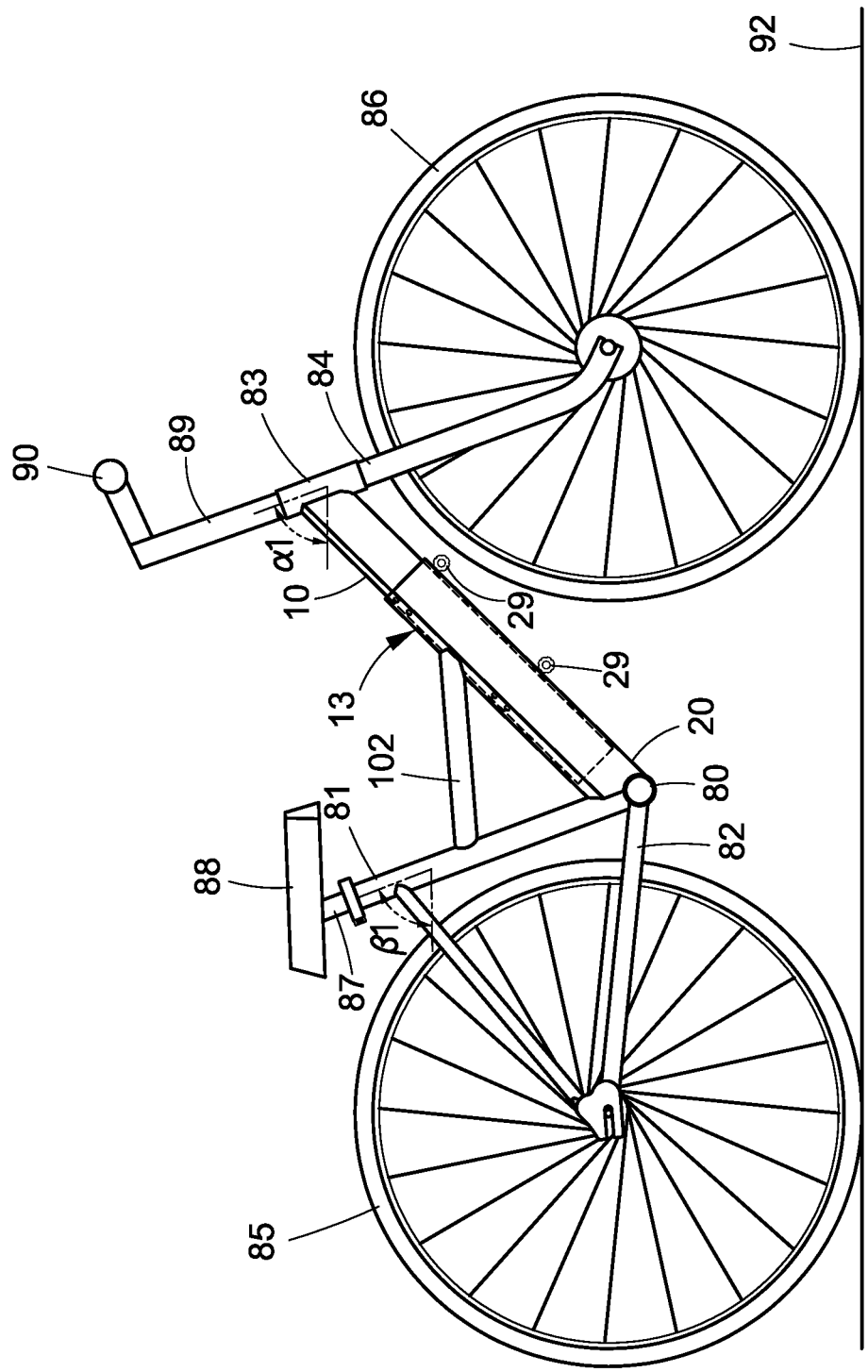
FIG. 1 is a side view of an adjustable bicycle frame for change in the riding modes according to the invention.
Figure 2:
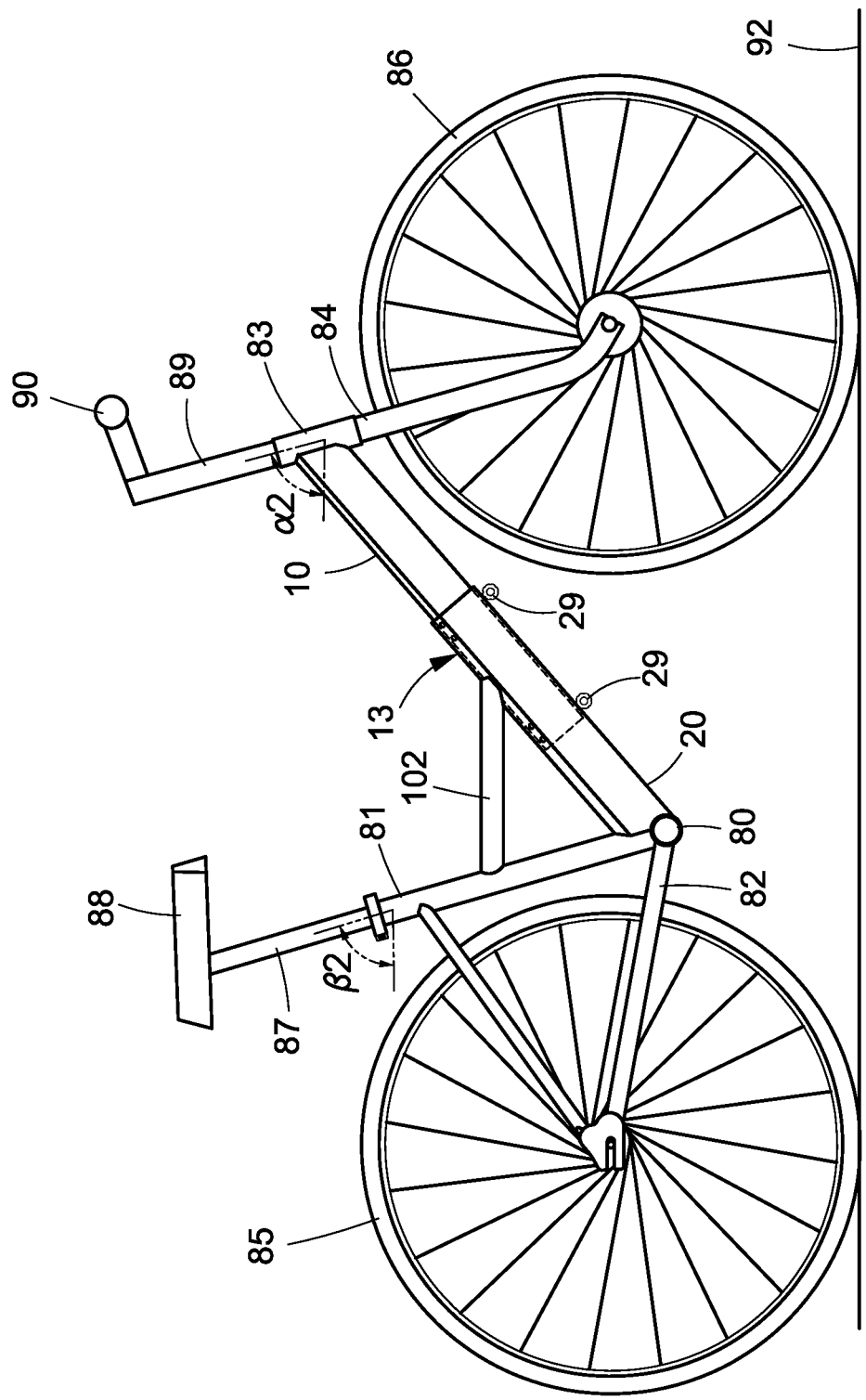
FIG. 2 is a view similar to FIG. 1 with the telescopic tubing extended.

Referring to FIGS. 1 to 2, an adjustable bicycle frame for the change in the riding modes in accordance with the invention comprises a bottom bracket 80 in which component of a crank with two pedals (not shown) are secured. A seat tube 81 obliquely, extending upward out of the bottom bracket 80, a chain stay 82 extending rearward out of the bottom bracket 80 and the seat tube 81, and an inclined telescopic tubing 13 including a first tube 10 and a second tube 20 telescopically joined. The first tube is extending into the second tube allowing telescopically change the total length of the both tubes put together. Thus, length of the first and second tubes 10, 20 can be stretched or retracted. Also, angles of the seat tube 81 and head tube 83 can be changed.

The second tube 20 obliquely extends forward out of the lower end of the seat tube 81 and in the vicinity of the bottom bracket 80. The invention further provides two lock devices 29 for fastening the first and second tubes 10, 20 after adjusting a relative position of the first and second tubes 10, 20. The first tube 10 obliquely extends downward out of the head tube 83, and a fork 84 pivotably secured to the head tube 83 and extending downward. The lock devices 29 are located at two different positions of the second tube 20.

The invention further comprises a crossbar 102 interconnecting the seat tube 81 and the telescopic tubing 13 so that a rhombic structure is formed by the chain stay 82, the crossbar 102, and the telescopic tubing 13. Height of the crossbar 102 is lowered and thus the saddle 88 can be lowed. This facilitates women or children to come aboard the bicycle.

Alternatively, the telescopic tubing 13 can be connected to the seat tube 81 proximate the bottom bracket 80 and it is within the scope of the invention.

The bicycle further comprises a rear wheel 85 rotatably secured to the chain stay 82, a front wheel 86 rotatably secured to the fork 84, a seat post 87 supported by the seat tube 81 and extending upward, a saddle 88 mounted on the seat post 87, a stem 89 pivotably secured to the head tube 83, and a handlebar 90 secured to the stem 89 in which the fork 84 and the stem 89 can be co-rotated to change a steering direction of the front wheel 86, a transmission (not shown) activated by pedaling for transmitting power to the rear wheel 85 or the front wheel 86, and a brake device (not shown).

As shown in FIG. 1, the first tube 10 may slide within the second tube 20 to shorten length of the telescopic tubing 13. Next, manipulations of the lock devices 29 lock both the first and second tubes 10, 20 after the length adjustment. The length between the front wheel 86 and the rear wheel 85 is decreased. It is shown that the telescopic tubing 13 is inclined downward and both the front and rear wheels 86, 85 are in contact with the ground 92. Thus, inclined angles of both the seat tube 81 and the head tube 83, with the telescopic tubing 13 connected therebetween, are decreased (i.e., an angle between 69-71 degree). In FIG. 1, α1 represents an angle between the head tube 83 and the ground 92 and β1 represents an angle between the seat tube 81 and the ground 92. The decrease of the length between the front wheel 86 and the rear wheel 85 can make this riding mode of the bicycle of the invention more suitable for low speed riding of urban traffic. This is because a rider can sit upright in a relaxing manner of riding, and the rider may not be tiresome. Vibrations caused by the ground can be minimized as the inclined angles of both the seat tube 81 and the head tube 83 are decreased (i.e., an angle between 69-71 degree). Thus, the hand griping the handlebars may feel a degree of comfort. Further, center of gravity of the rider moves rearward. Thus, the rider may not tend to fall when making an emergency brake or descending a hill. While it may decrease maneuverability of the bicycle, but the riding is more stable.

As shown in FIG. 2, the first tube 10 may slide from the second tube 20 to increase length of the telescopic tubing 13. Next, manipulations of the lock devices 29 lock both the first and second tubes 10, 20 after the length adjustment. As a result, length between the front wheel 86 and the rear wheel 85 is increased. It is shown that the telescopic tubing 13 is inclined downward and both the front and rear wheels 86, 85 are in contact with the ground 92. Thus, inclined angles of both the seat tube 81 and the head tube 83, with the telescopic tubing 13 connected therebetween, are increased (i.e., an angle between 73-75 degree). This riding mode is more suitable for high speed riding of suburban traffic. In FIG. 2, α2 represents an angle between the head tube 83 and the ground 92 and β2 represents an angle between the seat tube 81 and the ground 92. The increase of the length between the front wheel 86 and the rear wheel 85 can make riding of the bicycle of the invention more suitable for taller riders or a high speed riding by leaning forward. The inclined angles of the seat tube 81, the head tube 83 and the fork 84 are increased in response to the increase of the length between the front wheel 86 and the rear wheel 85. Further, the inclined angle of the head tube 83 is increased and maneuverability of the bicycle is upgraded. The increase of the inclined angle of the seat tube 81 may facilitate pedaling.

Figure 3:
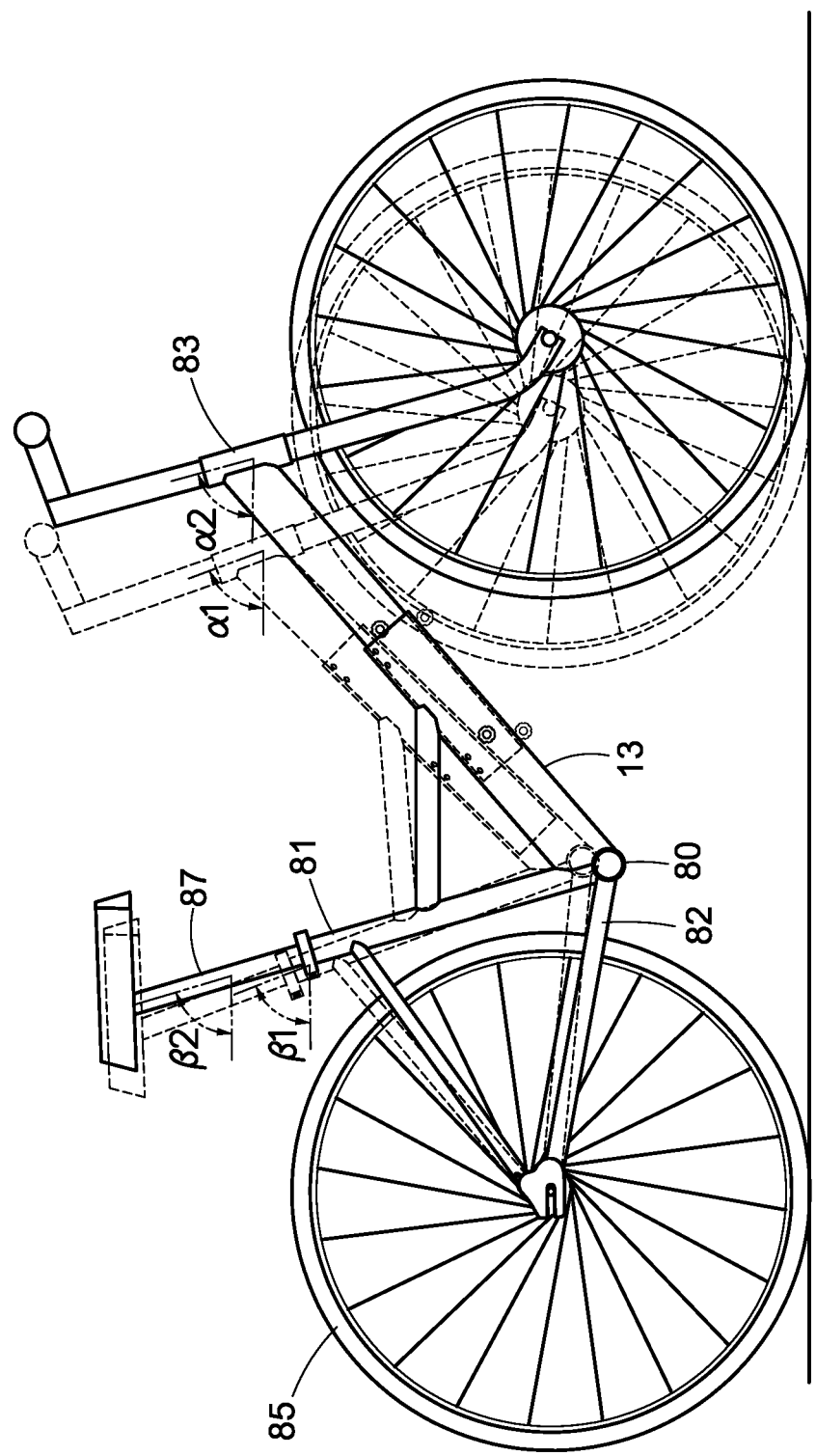
FIG. 3 is a view similar to FIG. 2 with the dotted lines showing positions of bicycle parts after the telescopic tubing is retracted.

Referring to FIG. 3, differences between FIG. 1 and FIG. 2 are discussed below. Solid lines denote relative positions and angles of both the seat tube 81 and head tube 83 with respect to the stationary rear wheel 85 when the telescopic tubing 13 is extended. Dotted lines denote relative positions and angles of both the seat tube 81 and head tube 83 with respect to the stationary rear wheel 85 when the telescopic tubing 13 is retracted. It thus is easy to understand structural variations of the frame when the telescopic tubing 13 is extended or retracted. Both angles α1, (representing an angle of the head tube 83 with respect to the ground 92) and angle β1 (representing an angle of the seat tube 81 with respect to the ground 92) are preferably smaller when the telescopic tubing 13 is retracted. This makes it appropriate for a slow, comfortable riding mode in the city. On the contrary, both angle α2 (representing an angle of the head tube 83 with respect to the ground 92) and angle β2 (representing an angle of the seat tube 81 with respect to the ground 92) are preferably larger when the telescopic tubing 13 is extended. This makes it appropriate for a racing riding mode in the suburban.

Figure 4:
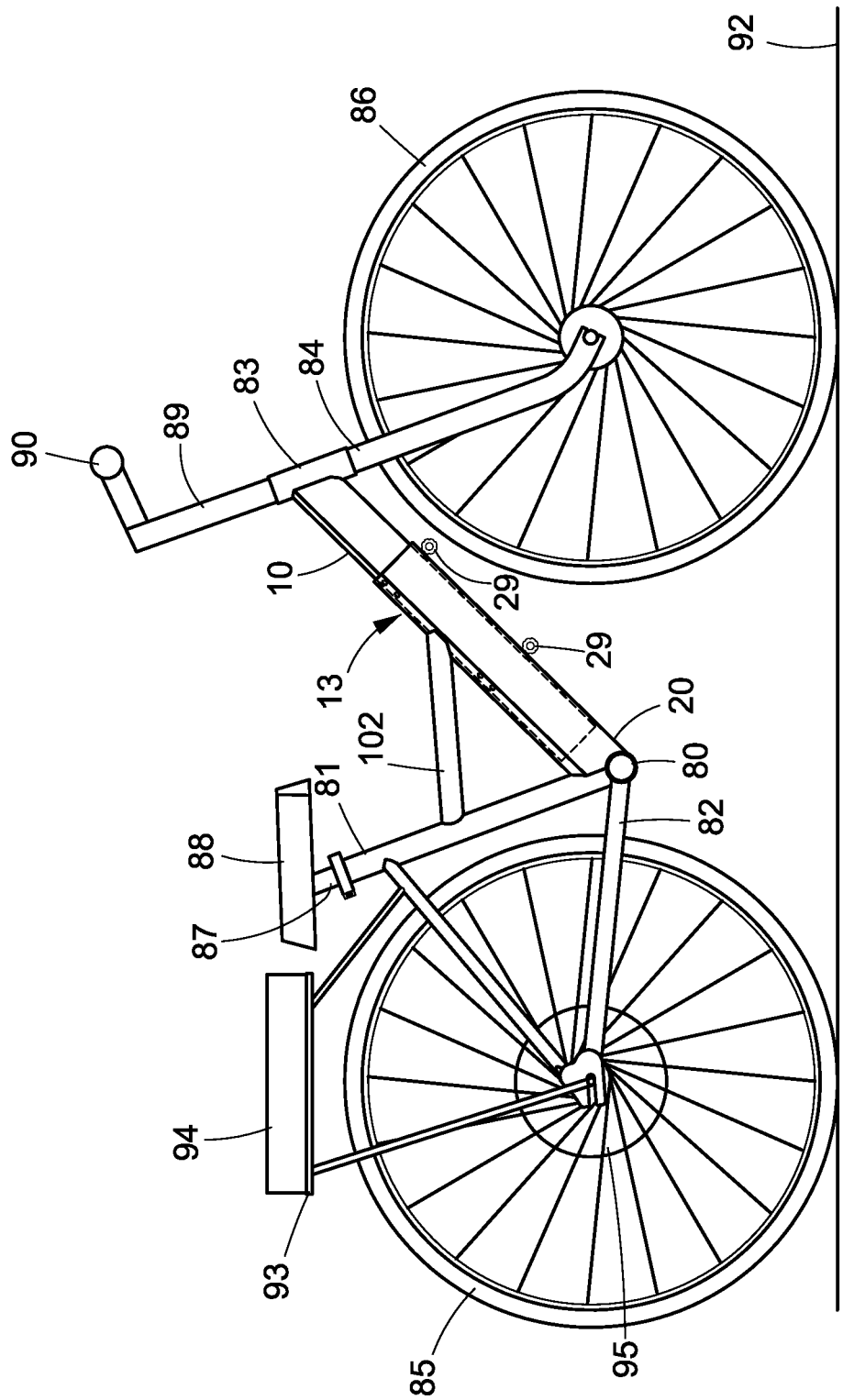
FIG. 4 is a side view of an electric bicycle incorporating the adjustable bicycle frame for change in the riding modes according to the invention.

Referring to FIG. 4, the adjustable bicycle frame for the change in the riding modes of the invention is applied to an electric bicycle as below. A rechargeable battery 94 is mounted on a carrier 93. An electric motor 95 is mounted on a hub of the rear wheel 85. A controller (not shown) is provided to manage the battery 94 to supply direct current to the motor 95 so that the bicycle may move forward. Rider may select one of three models available (e.g. an electric mode, an electric and manual mixing mode, or a manual mode). It is understood that if the charge of the battery 94 is found low, rider's only choice would be to use manual mode. All of the above modes are appropriate for different angles of the frame parts. In comparison, the conventional electric bicycles having fixed frame may be ridden in one of the three modes in an undesired condition. Details of the undesired condition are discussed below.

Once the electric mode is selected, a rider does not have to pedal when riding. This is similar to riding a motorcycle. In this mode, the rider just put his feet on the pedal. Thus, the seat tube 81 is not necessary to have a greater angle which is not quite comfortable in riding. This is not appropriate for racing. It is all about comfort. It should be viewed as a city riding mode. A rider can sit upright comfortably hold the handlebars 90 since the length between the front wheel 86 and the rear wheel 85 is decreased. Further, both the seat tube 81 and the head tube 83 are more inclined rearward. This moves center of gravity of the bicycle rearward. As a result, the rider does not tend to tip when riding.

When the rider put it on the electric and manual mixing mode, he does not have expert himself on the pedal yet. He still has to pedal but with less force. Thus, the seat tube 81 and the head tube 83 are not required to have a greater angle with respect to. This is not appropriate for racing. It is about comfort. It should be viewed as a city riding mode. In this mode, the length between the front wheel 86 and the rear wheel 85 is greater than that in the electric mode. Further, both the seat tube 81 and the head tube 83 are more inclined rearward. Also, the rider can comfortably grip the handlebars 90.

Regarding the manual mode, a rider may select it as desire or may be forced to select it when the battery 94 is low. At this time, the electric bicycle can be deemed as a typical bicycle. For racing purpose or for tall riders, it is required to adjust the length between the front wheel and the rear wheel to its maximum. Further, both the seat tube 81 and the head tube 83 are more upright. This facilitates racing. It is noted that pedaling efficiency can be increased if the angle of seat tube 81 is larger toward 73 degree which is the maxmum. The rider may lean himself forward in order to decrease drag and boost his pedaling efficiency. A rider may enjoy racing since the length between the front wheel and the rear wheel is adjusted to an optimum. A maximum maneuverability can be obtained if the angle of the head tube 83 is made larger.

The adjustable bicycle frame for the change in the riding modes of the invention can be applied to an electric bicycle capable of being ridden in one of three modes as discussed above. A rider may incrementally adjust the length between the front wheel and the rear wheel, the length between the seat tube and the head tube, an inclined angle of the seat tube, and an inclined angle of the head tube so as to implement the selected one of the three modes for riding.

Figure 5:
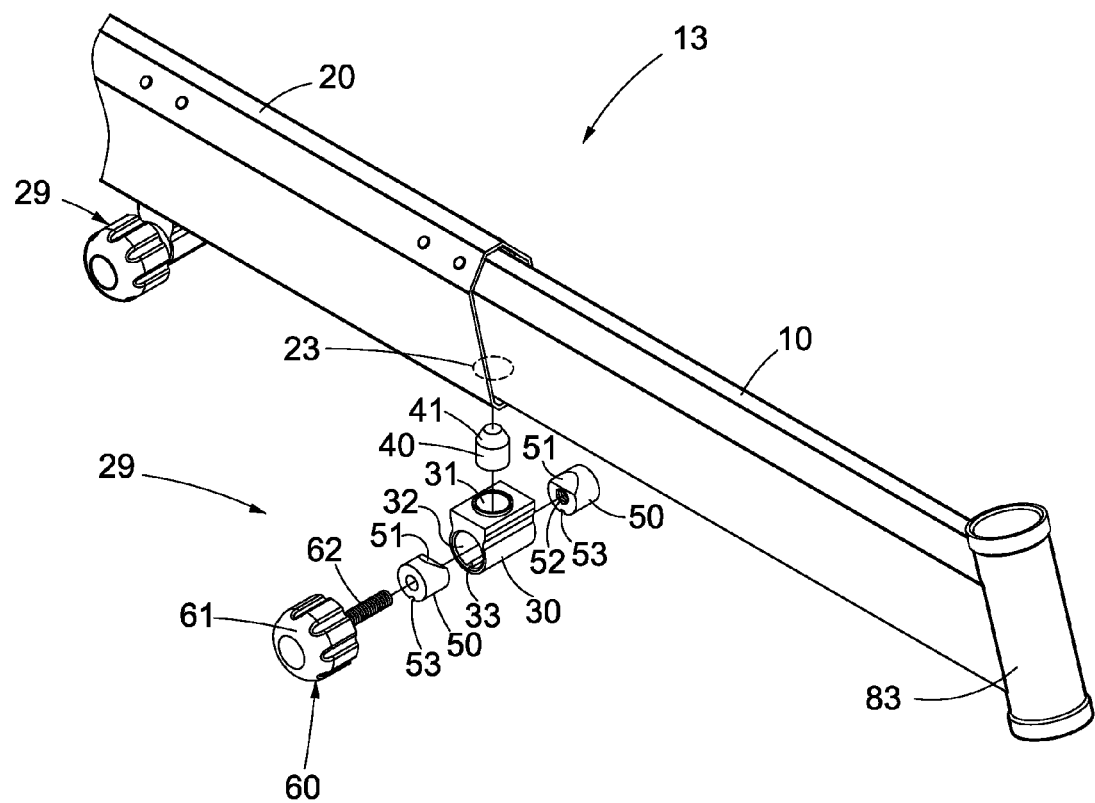
FIG. 5 is an exploded perspective view of the telescopic tubing and the lock device according to the first preferred embodiment of the invention.
Figure 6:
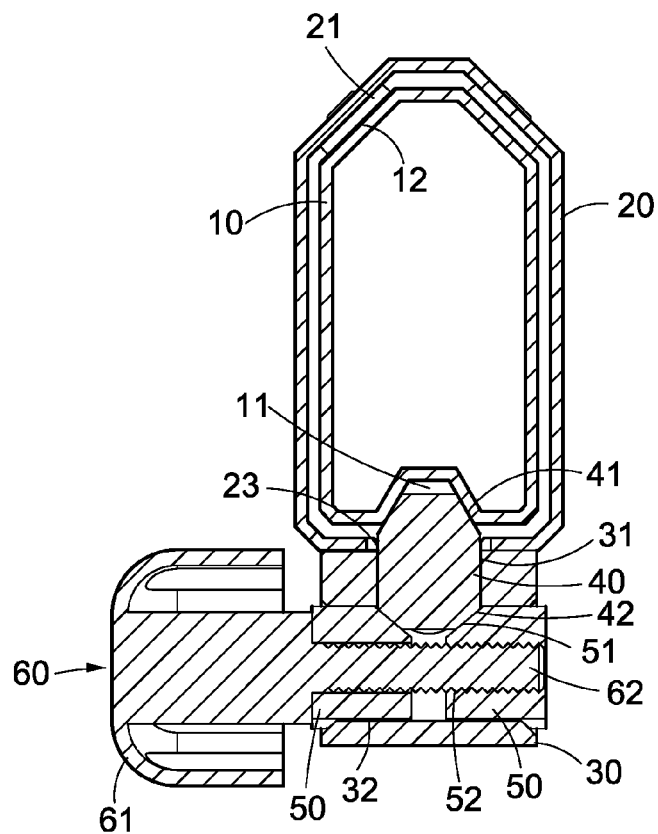
FIG. 6 is a cross sectional view of the first tube, the second tube, and the lock device of FIG. 5 being assembled and fastened.
Figure 7:
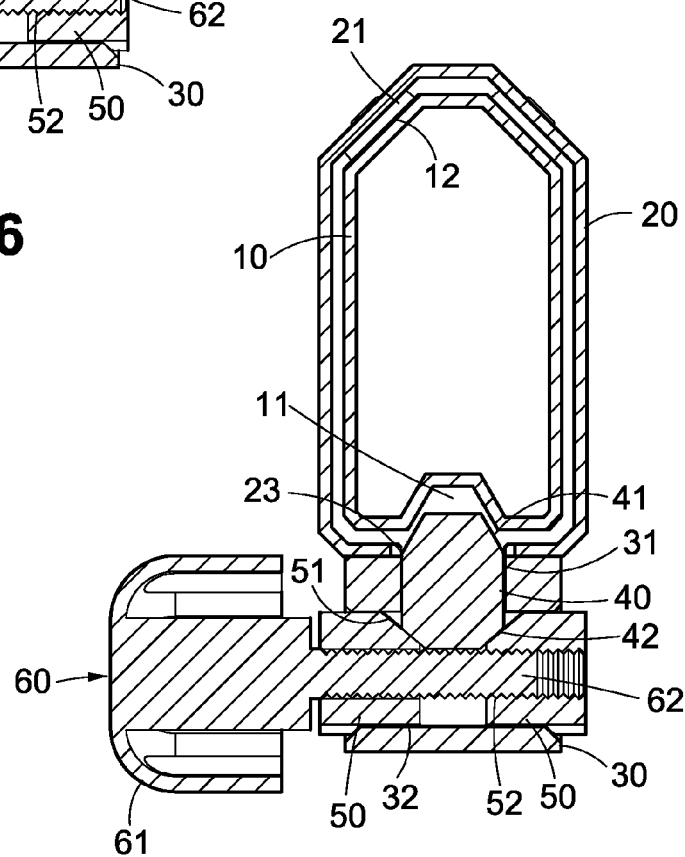
FIG. 7 is a view similar to FIG. 6 except the first and second tubes are not fastened by the lock device.

Referring to FIGS. 5 to 7, the telescopic tubing 13 is comprised of the first and second tubes 10, 20. The first tube 10 can slide within the second tube 20 so that the length of the telescopic tubing 13 can be increased or decreased. At least one lock device 29 is provided to fasten the first and second tubes 10, 20 after the length adjustment. One end of the second tube 20 is connected out of the lower end of the seat post tube 81 and in the vicinity of the bottom bracket 80, and the other end thereof is open. One end of the first tube 10 is connected to the head tube 83 and the other end thereof is disposed in the second tube 20. The first tube 10 can slide within the second tube 20 when the lock device 29 is unlocked.

Referring to FIGS. 5 to 7, a first preferred embodiment of the lock device 29 comprises a body 30, an urging member 40, two pushing members 50, and an actuator 60. The body 30 is disposed below an aperture 23 on a bottom of the second tube 20 and includes a vertical hole 31 for receiving the urging member 40, and a horizontal hole 32 for receiving the pushing members 50. The urging member 40 includes a conic top 41 complimentarily disposed in a groove 11 on a bottom of the first tube 10, and an inverted conic bottom 42. The opposite pushing members 50 are received in both ends of the horizontal hole 32 respectively. The pushing member 50 includes an inclined surface 51 urging against the inverted conic bottom 42 of the urging member 40.

Referring to FIGS. 6 and 7, the first tube 10 comprises the groove 11 having a truncated gable longitudinal section, and a top 12 having a truncated gable longitudinal section. The groove 11 is formed on the bottom of the first tube 10 so as to prevent rain or dirt accumulated in the groove 11. The top 12 is formed on a top of the first tube 10. The second tube 20 has at least one aperture 23 directly under the groove 11 so that the urging member 40 passes through the aperture 23 into the groove 11. The second tube 20 further comprises at least one spacer 21 on an inner surface contacting the inclined surface of the top 12.

It is noted that a screw (not shown) or other stop member is provided at the bottommost portion of the groove 11 of the first tube 10 for preventing the first tube 10 from being disengaged from the second tube 10 when sliding the first tube 10 in the second tube 20.

As shown in FIG. 5, a guide rail 33 is provided in the horizontal groove 32 of the body 30. The pushing member 50 comprises a guide trough 53 complimentarily disposed on the guide rail 33. Thus, the pushing member 50 can linearly move in the horizontal hole 32 of the body 30.

As shown in FIG. 6, in the first preferred embodiment the actuator 60 comprises a knob 61 and a threaded shaft 62. Internal threads 52 are formed axially through the pushing member 50. A user may turn the knob 61 clockwise to threadedly push the threaded shaft 62 through the internal threads 52. Thus, the pushing members 50 may move toward each other. And in turn, the inclined surfaces 51 urge the inverted conic bottom 42 to push the urging member 40 upward. Further, the conic top 41 of the pushing member 40 may pass through the aperture 23 to urge against the groove 11 of the first tube 10. And in turn, the first and second tubes 10 and 20 are tightly engaged. Also, the top 12 of the first tube 10 urges against the spacer 21 of the second tube 20. Thus, the first and second tubes 10, 20 are fastened together, thereby preventing the first tube 10 from sliding relative to the second tube 20.

As shown in FIG. 7, a user may turn the knob 61 counterclockwise to draw the pushing members 50 away from each other. And in turn, the urging member 40 falls due to its weight and no support from the pushing members 50. The conic top 41 of the pushing member 40 clears out of the groove 11 of the first tube 10. The pushing member 40 is disengaged from the first tube 10. Also, the top 12 of the first tube 10 is disengaged from the spacer 21 of the second tube 20. Thus, the first and second tubes 10, 20 are unfastened, thereby allowing the first tube 10 to slide in the second tube 20 for length adjustment of the telescopic tubing 13.

Referring to FIGS. 8 and 9, a second preferred embodiment of the lock device 29 is shown. The lock device 29 comprises an urging member 76 and an actuation device 70. The urging member 76 includes a top 77 of truncated conic longitudinal section to be complimentary to the groove 11 of the first tube 10. An actuation of the actuation device 70 urges the urging member 76 against the groove 11 of the first tube 10. Thus, the first and second tubes 10, 20 are fastened together. Also, the top 12 of the first tube 10 urges against the spacer 21 of the second tube 20. The actuation device 70 is a threaded, manual actuation device and includes a nut 71 having internal threads 74 and an internal space 75 for receiving the urging member 76 and communicating with the threads 74, a handle 72, and a threaded shaft 73 formed with the handle 72 and threadedly secured to the threads 74. A clockwise turning of the handle 72 moves the shaft 73 which in turn pushes the urging member 76 further into the groove 11 to fasten the first and second tubes 10, 20 together.

As shown in FIG. 9, a counterclockwise turning of the handle 72 causes the urging member 76 to clear out of the groove 11. Thus, the urging member 76 and the groove 11 are disengaged. Also, the top 12 of the first tube 10 does not urge against the spacer 21. Thus, the first tube 10 is not fastened by the second tube 20, thereby allowing the first tube 10 to slide in the second tube 20.

The lock device 29 of the invention has been discussed with two embodiments. Other locking and fastening devices such as quick releases found in bicycles can be used to replace the lock device 29 without departing the spirit and scope of the invention.

Figure 10:
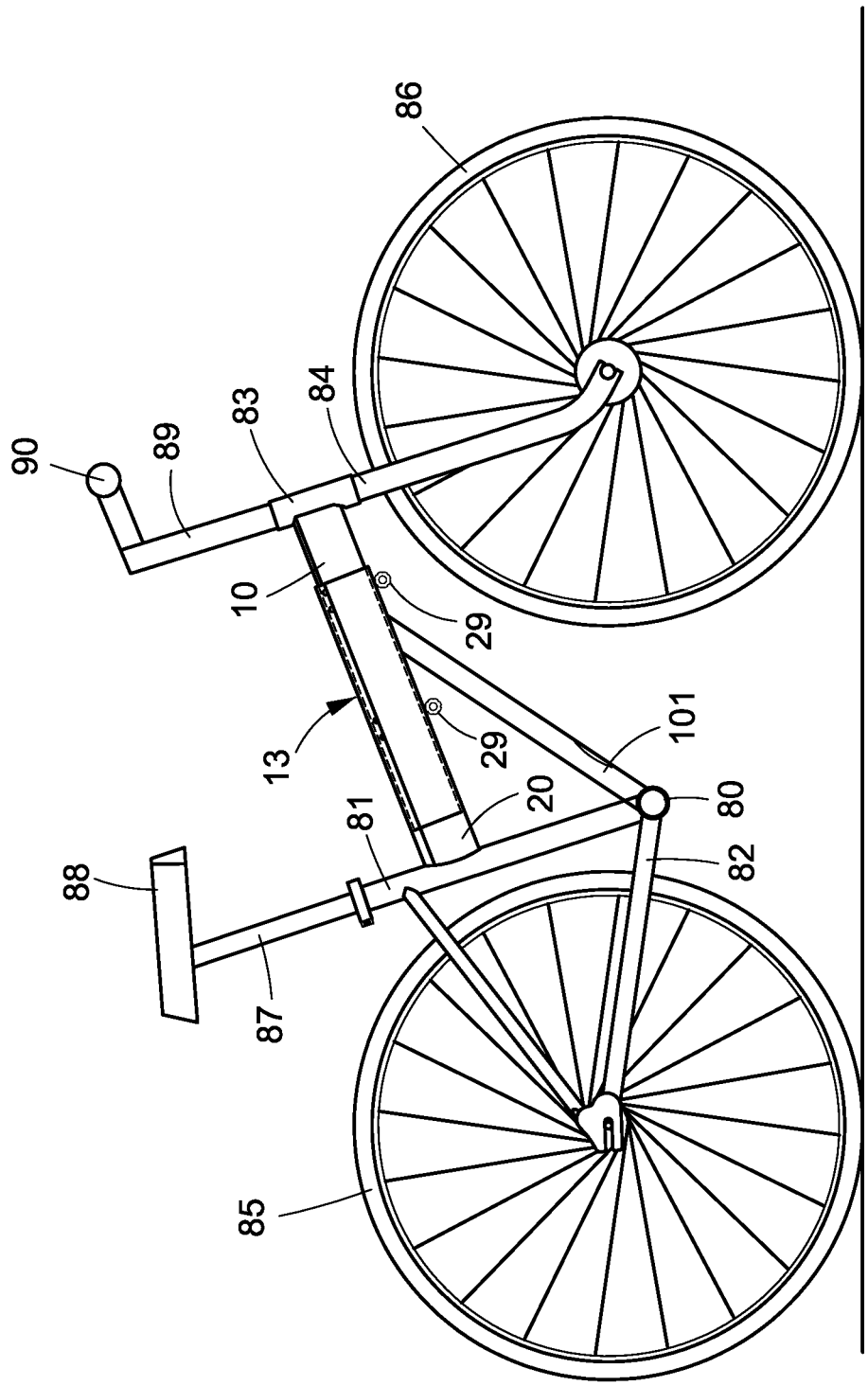
FIG. 10 is a side view of an adjustable bicycle frame for change in riding modes according to another preferred embodiment of the invention.

Referring to FIG. 10, it shows an adjustable bicycle frame for change in riding modes according to another preferred embodiment of the invention. The characteristics of another preferred embodiment are substantially the same as the adjustable bicycle frame shown in FIG. 1 in which the same elements are labeled by the same reference numerals. Differences between the adjustable bicycle frame shown in FIG. 1 and that shown in FIG. 10 are as follows. The telescopic tubing 13 is inclined downward, rearward. The second tube 20 is connected to the seat tube 81 at a position of relatively high. This decreases the inclined angle of the telescopic tubing 13 with respect to the ground. A down tube 101 has one end joined the bottom of the second tube 20 and the other end joined the bottom bracket 80. As a result, the structural strength of the bicycle frame is increased.

Figure 11:
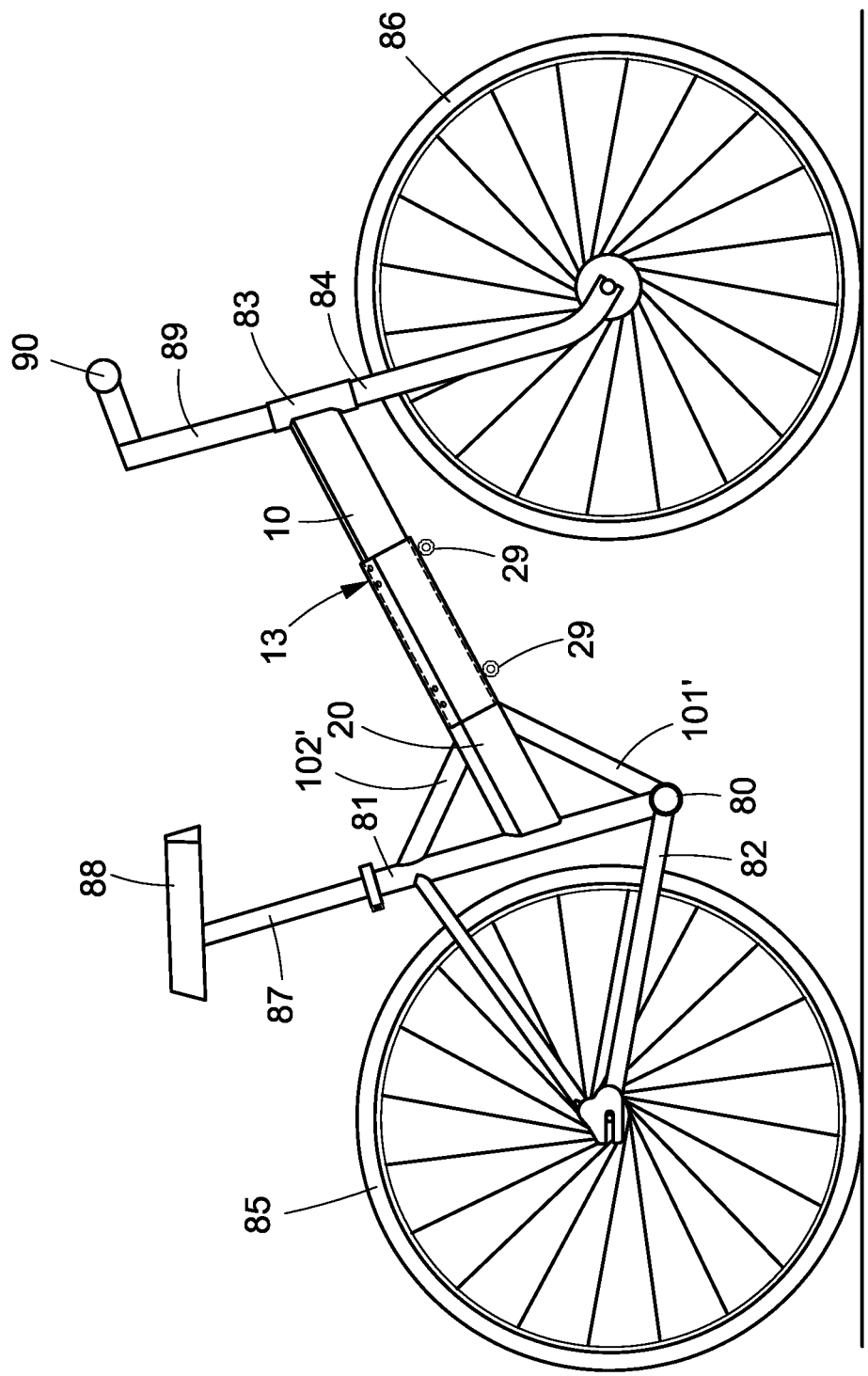
FIG. 11 is a side view of an adjustable bicycle frame for change in riding modes according to a further preferred embodiment of the invention.

Referring to FIG. 11, it shows a side view of an adjustable bicycle frame for change in riding modes according to a further preferred embodiment of the invention. The characteristics of the further preferred embodiment are substantially the same as the adjustable bicycle frame shown in FIG. 1 in which the same elements are labeled by the same reference numerals. Differences between the adjustable bicycle frame shown in FIG. 1 and that shown in FIG. 11 are as follows. An upper tube 102' has one end joined the top of the second tube 20 and the other end joined the seat tube 81. A down tube 101' has one end joined the bottom of the second tube 20 and the other end joined the bottom bracket 80. The upper tube 102' and the down tube 101' are generally symmetric about the second tube 20. As a result, the structural strength of the bicycle frame is increased.

It is envisaged by the invention that the adjustable bicycle frame allows a rider to incrementally adjust length between front wheel and rear wheel, length between seat tube and head tube, an inclined angle of the seat tube, and an inclined angle of the head tube so as to implement a selected riding mode and accommodate riders of different body heights. Further, it allows a rider to adjust an inclined angle of the seat tube and an inclined angle of the head tube while adjusting the length between the front wheel and the rear wheel and the length between the seat tube and the head tube. Therefore, it is possible of implementing a selected one of different riding modes. Inclined angle of both the seat tube and the head tube are increased after the length between the seat tube and the head tube are elongated. The rider may lean forward to decrease wind drag and facilitate pedaling. A maximum maneuverability can also be obtained. On the contrary, inclined angles of both the seat tube and the head tube are decreased after decreasing the length between the seat tube and the head tube. This allows a rider to sit upright in a relaxing manner of riding. In this case, the rider may not tend to fall when making an emergency brake or descending a hill.

While the invention has been described in terms of preferred embodiments, those skilled in the art will recognize that the invention can be practiced with modifications within the spirit and scope of the appended claims.

What is claimed is:

1. An adjustable bicycle frame for change in riding modes comprising:
    a bottom bracket;
    a seat tube joining the bottom bracket and extending upward out of the bottom bracket;
    a chain stay joining the bottom bracket and the seat tube and extending rearward out of the bottom bracket and the seat tube;
    a rear wheel rotatably secured to the chain stay and being in contact with a supporting ground;
    a head tube with a stem pivotably secured thereto;
    a fork pivotably secured to the head tube and extending downward;
    a front wheel rotatably secured to the fork stay and being in contact with the supporting ground;
    a rearward inclined telescopic tubing including a first tube and a second tube, the first tube extending into the second tube allowing telescopically change the total length of the both tubes put together wherein the second tube is inclined and extends forward, upward out of the lower end of the seat post tube and in the vicinity of the bottom bracket, the first tube is always fixedly connected without relative movement or rotation with respect to the head tube and extends rearward, downward out of the head tube, even when changing length of the telescopic tubing, a length between the front wheel and the rear wheel is changed, the inclined angles of both the seat tube and head tube are changed coherently, due to inclination of the telescopic tubing and the contact of the supporting ground with both the front and rear wheels so as to implement a selected one of a plurality of riding modes; and
    at least one lock device each for locking both the first and second tubes on a predetermined position.

2. The adjustable bicycle frame for the change in the riding modes of claim 1, wherein each of the at least one lock device comprises:
    a groove having a truncated conic longitudinal section formed on the first tube;
    an aperture formed on the second tube and disposed under the groove;
    a body;
    an urging member;
    two opposite pushing members; and
    an actuator;
    wherein the body is disposed below the aperture of the second tube and includes a vertical hole for receiving the urging member, and a horizontal hole for receiving the pushing members;
    wherein the urging member includes a conic top complimentarily disposed in the groove of the first tube, and an inverted conic bottom;
    wherein the pushing members are received in both ends of the horizontal hole respectively, each of the pushing members include an inclined surface urging against the inverted conic bottom of the urging member; and
    wherein an actuation of the actuator draws the pushing members toward each other to cause the inclined surfaces of the pushing members to urge the inverted conic bottom so that the urging member moves upward, the conic top of the pushing member passes through the aperture of the second tube to urge against the groove of the first tube, and the first and second tubes are fastened together.

3. The adjustable bicycle frame for the change in the riding modes of claim 2, wherein the actuator includes a knob and a threaded shaft, and wherein each of the pushing members includes axial internal threads so that a turning of the knob threadedly pushes the threaded shaft through the axial internal threads to move the pushing members toward each other or draw the pushing members away from each other.

4. The adjustable bicycle frame for the change in the riding modes of claim 2, wherein the body includes a guide rail in the horizontal groove, and wherein each of the pushing members include a guide trough complimentarily disposed on the guide rail so that the pushing members are capable of linearly moving in the horizontal hole of the body.

5. The adjustable bicycle frame for the change in the riding modes of claim 2, wherein the first tube further includes at least one top having a truncated gable longitudinal section, and wherein the second tube further includes at least one spacer on an inner surface contacting the at least one top of the first tube so that in response to urging the at least one top of the first tube against the at least one spacer of the second tube, the first and second tubes are fastened together.

6. The adjustable bicycle frame for the change in the riding modes of claim 1 further comprising at least one crossbar having a fixed length, one distal end of the at least crossbar being always fixedly connected to the second tube.

* * * * *